United States Patent
Lopez-Ortiz et al.

(10) Patent No.: US 10,417,208 B2
(45) Date of Patent: Sep. 17, 2019

(54) CONSTANT RANGE MINIMUM QUERY

(71) Applicant: SAP SE, Walldorf (DE)

(72) Inventors: Alejandro Lopez-Ortiz, Walldorf (DE); Daniela Maftuleac, Walldorf (DE); Alejandro Salinger, Walldorf (DE); Jeffrey Pound, Walldorf (DE)

(73) Assignee: SAP SE, Walldorf (DE)

( * ) Notice: Subject to any disclaimer, the term of this patent is extended or adjusted under 35 U.S.C. 154(b) by 305 days.

(21) Appl. No.: 15/380,985

(22) Filed: Dec. 15, 2016

(65) Prior Publication Data

US 2018/0173738 A1 Jun. 21, 2018

(51) Int. Cl.
*G06F 16/22* (2019.01)
*G06F 16/2455* (2019.01)

(52) U.S. Cl.
CPC ...... *G06F 16/2237* (2019.01); *G06F 16/2246* (2019.01); *G06F 16/2455* (2019.01)

(58) Field of Classification Search
CPC .............. G06F 16/2237; G06F 16/2246; G06F 16/2455
See application file for complete search history.

(56) References Cited

PUBLICATIONS

Fischer et al., A New Succinct Representation of RMQ-Information and Improvements in the Enhanced Suffix Array, in Combinatorics, Algorithms, Probabilistic and Experimental Methodologies. ESCAPE 2007. Lecture Notes in Computer Science, vol. 4614, pp. 459-470, published 2007. (Year: 2007).*
Ferrada et al., Improved Range Minimum Queries, Journal of Discrete Algorithms 43, Available online Oct. 17, 2016. (Year: 2016).*
Fischer et al., Space-Efficient Preprocessing Schemes for Range Minimum Queries on Static Arrays, SIAM J. Comput., pp. 465-492, published Apr. 13, 2011. (Year: 2011).*
Sadakane, Compressed Suffix Trees with Full Functionality, Theory Comput. Systems published 2007. (Year: 2007).*
D. Davoodi et al., Succinct Representations of Binary Trees for Range Minimum Queries in: Computing and Combinatorics. COCOON 2012. Lecture Notes in Computer Science, vol. 7434. Published 2012. (Year: 2012).*
K. Sadakane, *Succinct Representations of lcp Information and Improvements in the Compressed Suffix Arrays*, Proceeding of Symposium on Discrete Algorithms (SODA'02), pp. 225-232, 2002.
M. Bender and M. Farach-Colton, The LCA Problem Revisited, In Proceedings of LATIN2000, LNCS 1776, pp. 88-94, 2000.

(Continued)

*Primary Examiner* — David T. Brooks

(57) ABSTRACT

A plus-minus-one array in which adjacent entries vary by no more than positive one and no less than negative one is accessed. A range minimum query directory tree including blocks and subblocks of the plus-minus-one array is determined. Blocks are contained in the plus-minus-one array and subblocks are contained in the blocks. A data structure characterizing positions of minimum elements within the range minimum query directory tree is generated. The characterization includes positions of minimums within each subblock, between subblocks in a respective block, within each block, and between blocks. The data structure is stored. Related apparatus, systems, techniques and articles are also described.

17 Claims, 14 Drawing Sheets

(56) References Cited

PUBLICATIONS

K. Sadakane, Compressed Suffix Trees with Full Functionality, Journal Theory of Computing Systems, vol. 41(4), pp. 589-607, 2007.
K. Sadakane, Succinct data structures for flexible text retrieval systems, Journal of Discrete Algorithms, vol. 5(1), pp. 12-22, 2007.
D. Clark, Compact Pat Trees, PhD thesis, p. 30-34.
S. Gog and M. Petri, Optimized Succint Data Structures for Massive Data, In Journal Software—Practice and Experience, vol. 44(11), pp. 1287-1314, 2014.
G. Navarro, Spaces, trees and colors: The algorithmic landscape of document retrieval on sequences, ACM Comput. Surv. 46, 4, Article 52 (Mar. 2014).
P. Ferragina and G. Manzini, Indexing Compressed Text, 2005.
S. Muthukrishnan, Efficient algorithms for document retrieval problems, 2002.
R. Gonzales et al., Practical implementation of Rank and Select queries, 2005.
A. Golynski, J.I. Munroand S.S. Rao, Rank/Select Operations on Large Alphabets: a Tool for Text Indexing, 2006.

\* cited by examiner

A = [0 1 2 3 4 3 2 3 4 5 6 7 8 7 6 7]
Blocks = [0 1 2 3] [4 3 2 3] [4 5 6 7] [8 7 6 7]
Subblocks = [0 1] [2 3] [4 3] [2 3] [4 5] [6 7] [8 7] [6 7]

MinBlock = [1 2 1 2]
MinSubblock = [1 1 2 1 1 1 2 1]

MinInSubblock[i, j, k]

| Subblock of type $i = 0$ | | | | Subblock of type $i = 1$ | | | |
|---|---|---|---|---|---|---|---|
| $j\backslash k$ | 0 | 1 | 2 | $j\backslash k$ | 0 | 1 | 2 |
| 0 | 1 | 1 | 2 | 0 | 1 | 1 | 2 |
| 1 | 1 | 2 | 2 | 1 | 1 | 2 | 2 |
| 2 | 2 | 2 | 2 | 2 | 2 | 2 | 2 |

*FIG. 6*

MinBetweenSubblocks[i, j, k]

| Block i = 1 | | | Block i = 2 | | | Block i = 3 | | | Block i = 4 | | |
|---|---|---|---|---|---|---|---|---|---|---|---|
| j\k | 0 | 1 | j\k | 0 | 1 | j\k | 0 | 1 | j\k | 0 | 1 |
| 1 | 1 | 1 | 1 | 1 | 2 | 1 | 1 | 1 | 1 | 1 | 2 |
| 2 | 2 | 2 | 2 | 2 | 2 | 2 | 2 | 2 | 2 | 2 | 2 |

*FIG. 7*

MinBetweenBlocks[i,j]:

| i\j | 1 | 2 | 3 | 4 |
|---|---|---|---|---|
| 1 | 0 | 1 | 2 | 2 |
| 2 | 1 | 1 | 1 | 1 |
| 3 | 2 | 2 | 2 | 2 |
| 4 | 3 | 3 | 3 | 3 |
| 5 | 4 | 4 | 4 | 4 |

FIG. 8

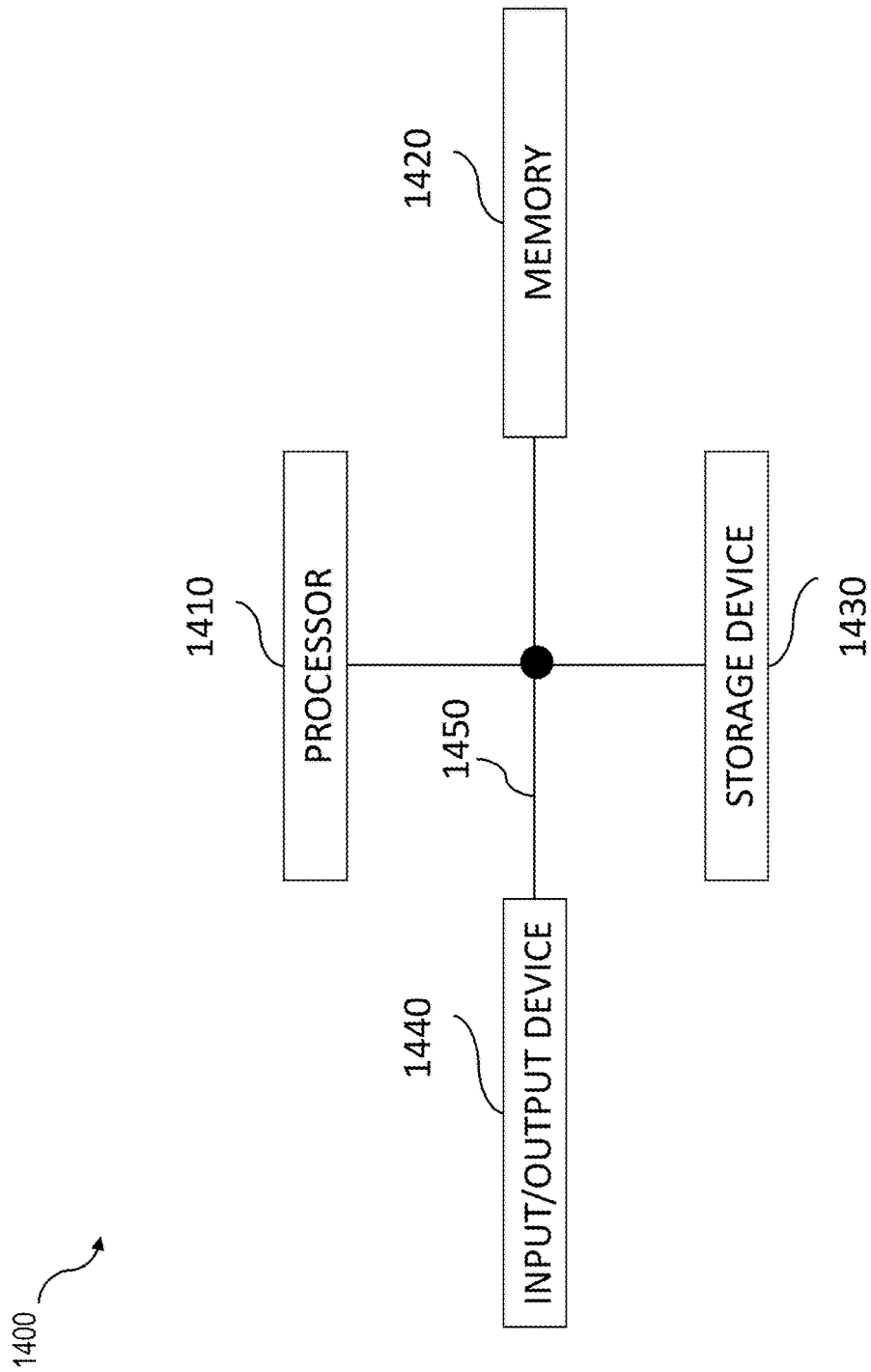

CONSTANT RANGE MINIMUM QUERY

TECHNICAL FIELD

The subject matter described herein relates to range minimum queries.

BACKGROUND

The amount of textual data stored by corporate enterprises has increased significantly in the last decades. A database must provide an efficient way of retrieving relevant information from this data. This task can be formalized as the document retrieval problem. For large text databases a sequential search over the contents is prohibitively slow.

SUMMARY

In an aspect, a plus-minus-one array in which adjacent entries vary by no more than positive one and no less than negative one is accessed. A range minimum query directory tree including blocks and subblocks of the plus-minus-one array is determined. Blocks are contained in the plus-minus-one array and subblocks are contained in the blocks. A data structure characterizing positions of minimum elements within the range minimum query directory tree is generated. The characterization includes positions of minimums within each subblock, between subblocks in a respective block, within each block, and between blocks. The data structure is stored.

In another aspect, data characterizing a plus-minus-one range minimum query for a plus-minus-one array is received. The plus-minus-one range minimum query includes a start position and an end position. A data structure characterizing a range minimum query directory tree associated with the plus-minus-one array is searched to find a minimum element in the plus-minus-one array between the start position and the end position. The range minimum query directory tree includes blocks and subblocks of the plus-minus-one array. Blocks are contained in the plus-minus-one array and subblocks are contained in the blocks. The data structure characterizes positions of minimum elements within the range minimum query directory tree. The characterization includes positions of minimums within each subblock, between subblocks in a respective block, within each block, and between blocks. The position of the minimum element in the plus-minus-one array between the start position and the end position is provided.

One or more of the following features can be included in any feasible combination. The data structure can include a first structure, a second structure, a third structure, a fourth structure, and a fifth structure. The first structure can store, for each block, a position of a subblock insi 65232680v.1 de each block in which a minimum element of the block is contained. The second structure can store, for each subblock, a position of a minimum element within each subblock. The third structure can store, for each subblock, a position of a minimum element between elements of the subblock. The fourth structure can store, for each block, a position of a subblock containing a minimum element between multiple subblocks within the respective block. The fifth structure can store a block containing a minimum element between multiple block. Each stored position can include a local index in a respective block or subblock.

Searching the data structure can include determining if the start position and the end position are: within a same subblock, within different subblocks of the same block, or within different blocks. Searching the data structure can include finding the position of the minimum element from the third data structure. Searching the data structure can include finding, using the fourth structure, a subblock containing the minimum element and finding, using the second structure, the position of the minimum element within the subblock containing the minimum element.

A range minimum query can be received. The range minimum query can include an input array, a second start position within the input array, and a second end position within the input array. The plus-minus-one array can be determined from the input array by computing a reduced bit vector that characterizes a binary tree of the input array. The bit vector can include a 1-bit for every leaf in the binary tree. The start position and the end position can be determined using select operations on the reduced bit vector with the second start position and the second end position.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 6 illustrates the example MinInSubblock values.

FIG. 7 illustrates the example table MinBetweenSubblocks;

FIG. 8 illustrates the example table MinBetweenBlocks;

FIG. 14 is a system block diagram illustrating an example computing system.

Like reference symbols in the various drawings indicate like elements.

DETAILED DESCRIPTION

The current subject matter relates to range minimum queries. A range minimum query (RMQ) is an operation that will, given an array C of length n, find the position of the minimum element in any interval C[s . . . e], where s is a starting position and e is an ending position. In order to answer range minimum queries on an arbitrary input array C in constant time per query and using only 2n+o(n) bits, a data structure is built which can answer RMQ in constant time per query on an plus-minus-one array. Any arbitrary array C can be represented by a Cartesian tree in the form of a plus-minus-one array, which is an array in which adjacent entries vary by no more than positive one and no less than negative one (e.g., +1 or −1). A directory tree can be utilized that conceptually breaks the plus-minus-one array into blocks and subblocks. Then an RMQ process on an plus-minus-one array, denoted as RMQ±, can be performed using a previously stored data structure that allows finding the position of the minimum element in any range of C in constant time per query. The current subject matter enables an RMQ that can be performed in constant time per query by utilizing the data structure.

Figure 1:
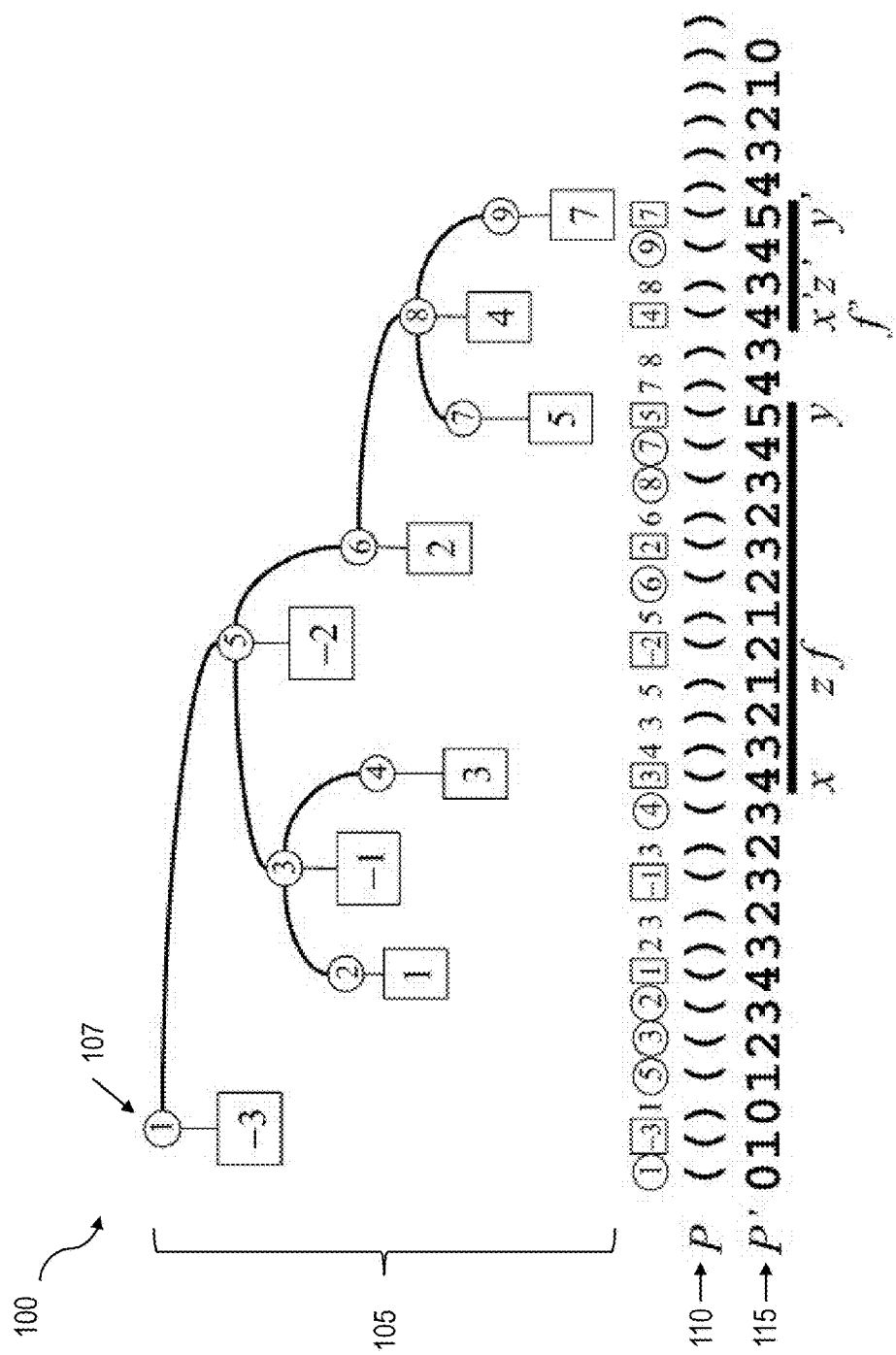
FIG. 1 illustrates an example Cartesian tree and other data structures during the reduction process for an example input array.

In order to compute RMQ on an arbitrary input array C of length n in constant time per query, a temporary Cartesian tree is constructed. The temporary Cartesian tree can be represented as a plus-minus-one array. FIG. 1 illustrates an example Cartesian tree 105 and other data structures during the reduction process for an example input array. In FIG. 1 the example input array C is equal to −3, 1, −1, 3, −2, 2, 5, 4, 7, with length n=9.

The Cartesian tree is a binary tree where each node of the tree corresponds to an element of C and contains the index of the element in C. The root 107 of the tree corresponds to the minimum element in the array (at index i) and its left and right subtrees are the Cartesian trees of in C[1 . . . , i−1] and C[i+1 . . . , n], respectively. A leaf is added to each node containing the value of the corresponding element in C.

The tree 105 can be represented as an array P of length 4n, using the symbols '(' and ')'. Traversing the Cartesian tree 105 of C in-order, writing a '(' in P each time a node is first reached and a ')' when coming back to that node after traversing its (possibly empty) subtrees. In FIG. 1, the example parenthesis array P is denoted as 110.

To answer an RMQ on C[s . . . e], an index i to the element C[i] can be converted into the position j of the '(' in P of the leaf whose parent has label i. Because each leaf has no child, it is represented by '( )' in P. Moreover, because leaves appear in P in the order of depth-first search, the order of the leaves in P is determined by the parents' labels. The parenthesis array P can be stored as a bit vector with 0 corresponding to '(' and 1 corresponding to ')'.

To find the Lowest Common Ancestor (LCA) between two nodes in a parenthesis sequence, an array P', which need not be stored, can be utilized. P'[i] can be defined as the difference between the number of '(' in P[1 . . . , i] and the number of ')' in P[1 . . . , i] minus 1, which can be calculated using constant rank operations on the bitmap P. Thus, there is no need to store P' explicitly, since P'[i] can be found in constant time. In FIG. 1, the example array P' is denoted as 115.

Then the Lowest Common Ancestor query is reduced to an RMQ on P'. P' is a plus-minus-array, that is, it has the property that the difference between two consecutive elements is +1 or −1, The RMQ on a plus-minus-one array P' is denoted by $RMQ_{P'}^{\pm}$.

The RMQ=i on C[s . . . e] can be expressed as the following:

1, $x=\text{Select}_{()}(P,s)$ and $y=\text{Select}_{()}(P,e)$

2, $z=RMQ_{P'}^{\pm}(x,y)$

3, If $P[z+2]=1\text{')'}$ then $f=z+1$ else $f=z-1$

4, $i=\text{Rank}_{()}(P,f)$

A select operation on a bit vector B (denoted $\text{Select}_c(B,i)$) returns the position in the sequence B of the $i^{th}$ occurrence of character c. For example, $\text{Select}_1(B,i)$ finds the position in the bit vector B of the $i^{th}$ 1-bit. Such a select operation is often simply written as Select(B,i). For a bit vector B, a rank operation, denoted $\text{Rank}_c(B,i)$, returns the number of occurrences of c in B[1 . . . , i]. For example, $\text{Rank}_1(B,i)$ finds the number of 1-bits in B[1 . . . , i], and can be written as Rank(B,i).

Rank and Select of the symbols '( )' (represented as 01) in the array of parenthesis P are performed (e.g., steps 1 and 4 above). To calculate Rank and Select efficiently, another bit vector Q can be built that marks the locations of 01 in P. Formally, Q[i]=1 if and only if [i . . . i+1]=01 , Then, it is possible to build regular Rank and Select data structures on Q to answer $\text{Rank}_{01}$ and $\text{Select}_{01}$ on P.

The extra space required by this approach is |P| plus the size of the Rank and Select structures on a bit vector of size |P|. The space of Q can be reduced to half by analyzing every three bits. Formally, define Q as follows:

$Q[i]=1 \Leftrightarrow P[2i \ldots 2i+1]=01$ or $P[2i+1 \ldots 2i+2]=01$

Then, $$\text{Rank}_{01}(P, i) = \begin{cases} \text{Rank}_1(Q, i/2) - 1, & \text{if } i \% 2 = 0, Q[i/2] = 1 \text{ and } P[i+1] = 0 \\ \text{Rank}_1(Q, i/2), & \text{otherwise} \end{cases}$$

In other words, subtract 1 to $\text{Rank}_{01}(Q,i/2)$ if P[i . . . i+2]=001 or 101 and rank on i even.

$\text{Select}_{01}(P,i)$ can be calculated as follows. Let $q=2\times\text{Select}_1(Q,i)$. Then, $$\text{Select}_{01}(P, i) = \begin{cases} q+1, & \text{if } P[q+1] = 0 \\ q, & \text{otherwise} \end{cases}$$

In other words, add 1 if the $i^{th}$ 01 is at the q+1 position instead of q.

Rank and Select data structures (for example, as described in more detail below) can be utilized for Q, which can be constructed for a bit vector of size |P|/2.

Figure 2:
FIG. 2 is a table showing an example P array, and an example Q array, and a reduced Q array.

FIG. 2 is a table 200 showing an example P array 205, Q array 210 that marks the locations of 01 in P array 205, and reduced Q array 215 that marks the locations of 01x or x01 in the P array 205 (where 'x' is a wildcard). As illustrated the length of reduced Q array 215 utilizing the alternative approach to creating bit vector Q is shorter (length 2n ) than vector P (length 4n). Thus, the alternative approach can reduce the length required to compute Rank and Select operations on parenthesis P array by half.

Figure 3:
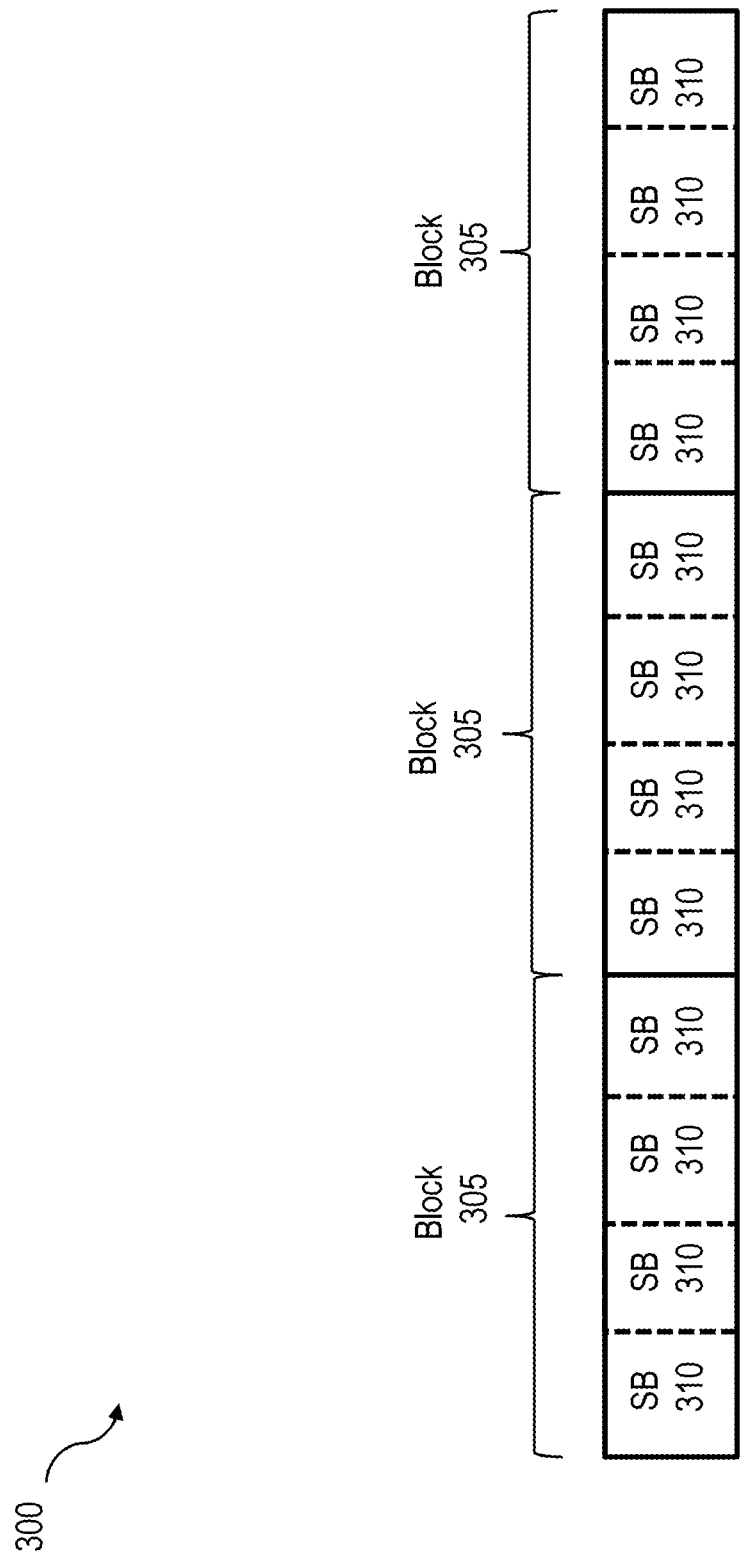
FIG. 3 illustrates an array A divided into blocks and subblocks.

In order to compute the RMQ$^±$operation on a given plus-minus-one array A of length n and between positions s and e, a directory tree structure can be conceptualized. The array A can be divided into blocks and each block can be divided into sub-blocks. FIG. 3 illustrates an array A 300 divided into blocks 305 and subblocks 310.

In some implementations, the array can be divided into blocks of length $log^3(n)$, then each block can be divided into subblocks of length log(n)/2.

Figure 4:
FIG. 4 illustrates an example data structure for enabling a constant time RMQ$^\pm$.

At preprocessing time (e.g., build-time), a data structure can be generated that can answer in constant time RMQ$^±$on A. FIG. 4 illustrates an example data structure 400 for enabling a constant time RMQ$^±$. The data structure 400 can include at least one structure that characterizes positions of minimum elements within the directory tree (e.g., the minimum values within blocks, subblocks, and ranges within the blocks and subblocks). As illustrated in FIG. 4, five structures can be defined and generated as part of the data structure 400. The data structure 400 can include MinBlock 405, MinSubblock 410, MinInSubblock 415, MinBetweenSubblocks 420, and MinBetweenBlocks 425.

MinBlock 405 can include an array and MinBlock[i] can store the number of the subblock inside the block i, in which the minimum element occurs.

MinSubblock 410 can include an array and MinSubblock [i] stores the position inside the subblock i where the minimum element occurs. MinSubblock 410 can characterize the position of the minimum element within each subblock.

MinInSubblock 415 can include a table and MinInSubblock[i,j,k] can store the position of the minimum element in the subblock of type i, between positions j and $j+2^k-1$ in the subblock. The type of a subblock can be used to reduce the size of the table. There can be 2n/log(n) subblocks and less than $\sqrt{n}$ (can depend on the entropy of the array) types of subblocks. A type of subblock can be represented by an integer that is the decimal number of the binary sequence obtained from a subblock of A (using 0 if the difference between two consecutive elements in the subblock is +1 and 1 if the difference is −1). MinInSubblock 415 can characterize positions of minimum elements between elements of a subblock.

MinBetweenSubblocks 420 can include a table and MinBetweenSubblocks[i,j,k] can store the number of the subblock that contains the minimum element in the block i, between subblock/and subblock $j+2^k-1$ in the block i. MinBetweenSubblocks 420 can characterize positions of minimum elements between subblocks within each block.

MinBetweenBlocks 425 can include a table, where MinBetweenBlocks[i,j,k] can store the number of the block that contains the minimum element, between block i and block $i+2^j-1$, MinBetweenBlocks 425 can characterize positions of minimum elements between blocks.

Each stored value, which is either the number of a block/subblock or the position of an element in a subblock, can be compressed to be the local index in the respective block/subblock (e.g., each stored position can be a local index). In this manner, stored values are small (relative to the size of the plus-minus-one array A) and the global position in the initial array can be reconstructed in constant time when needed.

Figure 5:
FIG. 5 illustrates an example plus-minus-one array A, corresponding blocks and sub-blocks, and example arrays MinBlock and MinSubblock

FIG. 5 illustrates an example plus-minus-one array A, corresponding blocks and subblocks, and a generated data structure for enabling a constant time range minimum query. In the example, A is of length n=16, divided into four blocks of length 4, and each block is subdivided into two subblocks each of length 2, The MinBlock includes the position or number of subblock inside each block in which the minimum occurs. In the example, the minimum value for blocks 1 to 4 occur in subblocks 1, 2, 1, and 2, respectively (where each subblock can have a position of 1 or 2). Similarly, the MinSubblock includes the position in each subblock where the minimum element is present. In the example, the minimum value for each subblock is illustrated.

FIG. 6 illustrates the example MinInSubblock values. MinInSubblock[i,j,k]=v, where i is in [1 . . . , types of different bit sequences in P]; j is in [1 . . . , length subblock] and j is the position inside the subblock; and k is in [0 . . . , log(length subblock)−1] and $2^k$ is the length of the interval in the subblock where minimum is considered; and v is the position of the minimum inside the subblock of type i, between positions j and $j+2^k-1$, In the example illustrated in FIG. 5, i∈[0 . . . 1] since there are 2 different types of subblocks: [0] and [1], where [0] represents the subblocks that are of form [i,i+1](e.g., subblocks [01], [23], [45], [67]) and [1] represents the subblocks of type [i,i−1]) (e.g., subblocks [43], [87]); j∈[1 . . . 2] and k∈[0 . . . 0]. MinInSubblock[i,j,k] is as follows: MinInSubblock[0,1, 1]=1, since the position of the minimum in a subblock of type [i,i+1] between positions 1 and $1+2^1-1=2$ is always on position 1; MinInSubblock[1,1,1]=2, since the position of the minimum in a subblock of type [i,i−1] between positions 1 and $1+2^1-1=2$ is always on position 2; and remaining values are illustrated in FIG. 6.

FIG. 7 illustrates the example table MinBetweenSubblocks[i,j,k], which is as follows: MinBetweenSubblocks[1, 1,1]=1, since the minimum in the block i=1, between subblock j=1 and subblock $j+2^k-1=2$ is found in subblock 1. FIG. 7 illustrates the remaining values. Note that $j+2^k-1$ can be larger than the total number of subblocks in a block, in which case it is considered as the last subblock of the block.

FIG. 8 illustrates the example table MinBetweenBlocks [i,j], which is as follows: MinBetweenBlocks[1,1]=1, since the minimum between the blocks i=1 and $i+2^j-1=2$ is found in block 1. FIG. 8 illustrates the remaining values. Note that $i+2^j-1$ can be larger than the total number of blocks, in which case it is considered as the last block.

Figure 9:
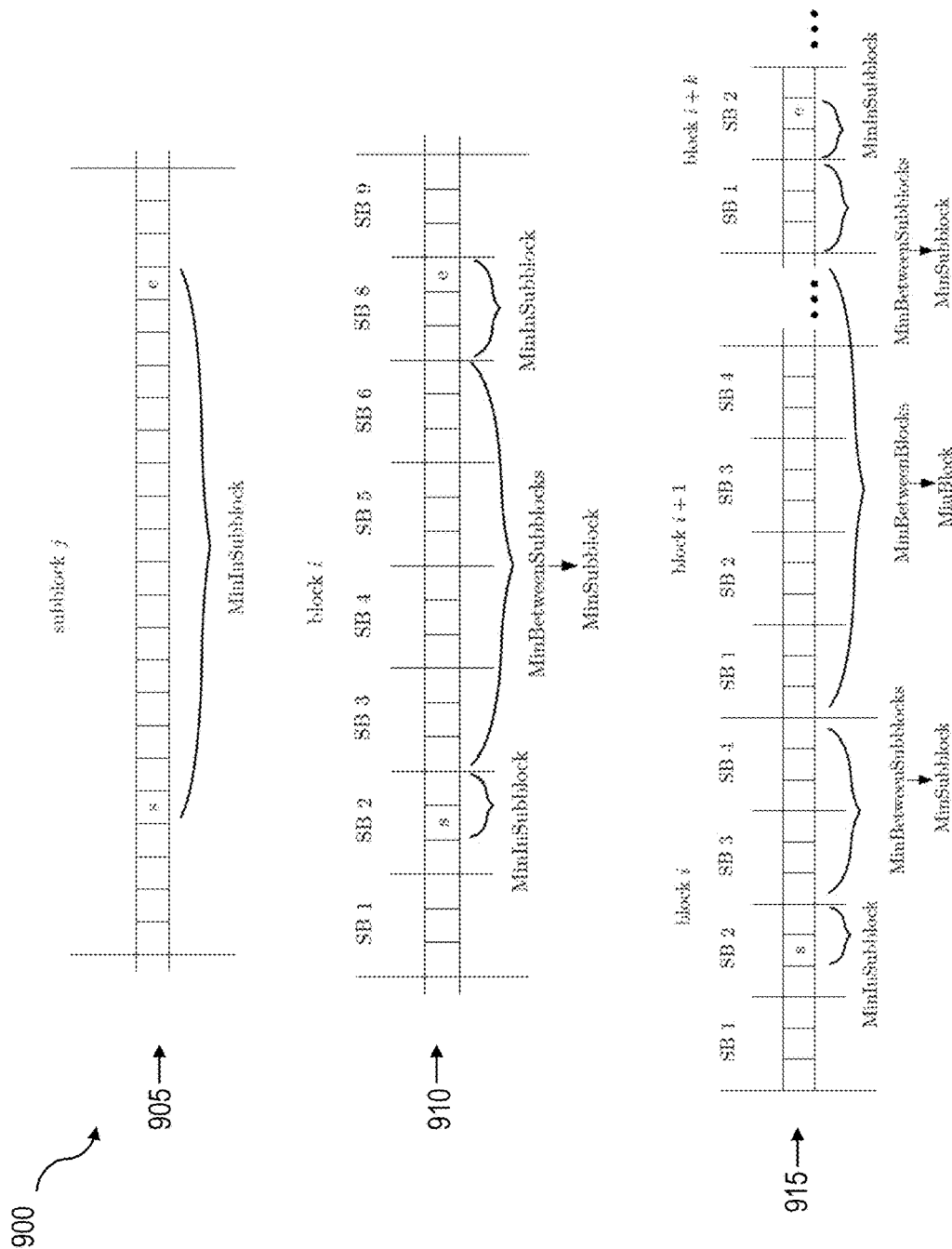
FIG. 9 illustrates the three possible cases for RMQ$\pm$ of the range start and end positions in the plus-minus-one array.

FIG. 9 illustrates the three possible cases for RMQ± of the range start (s) and end (e) positions: either s and e are in the same subblock (905), either s and e are in different subblocks of the same block (910), or s and e are in different blocks (915) of the plus-minus-one array.

Figure 10:
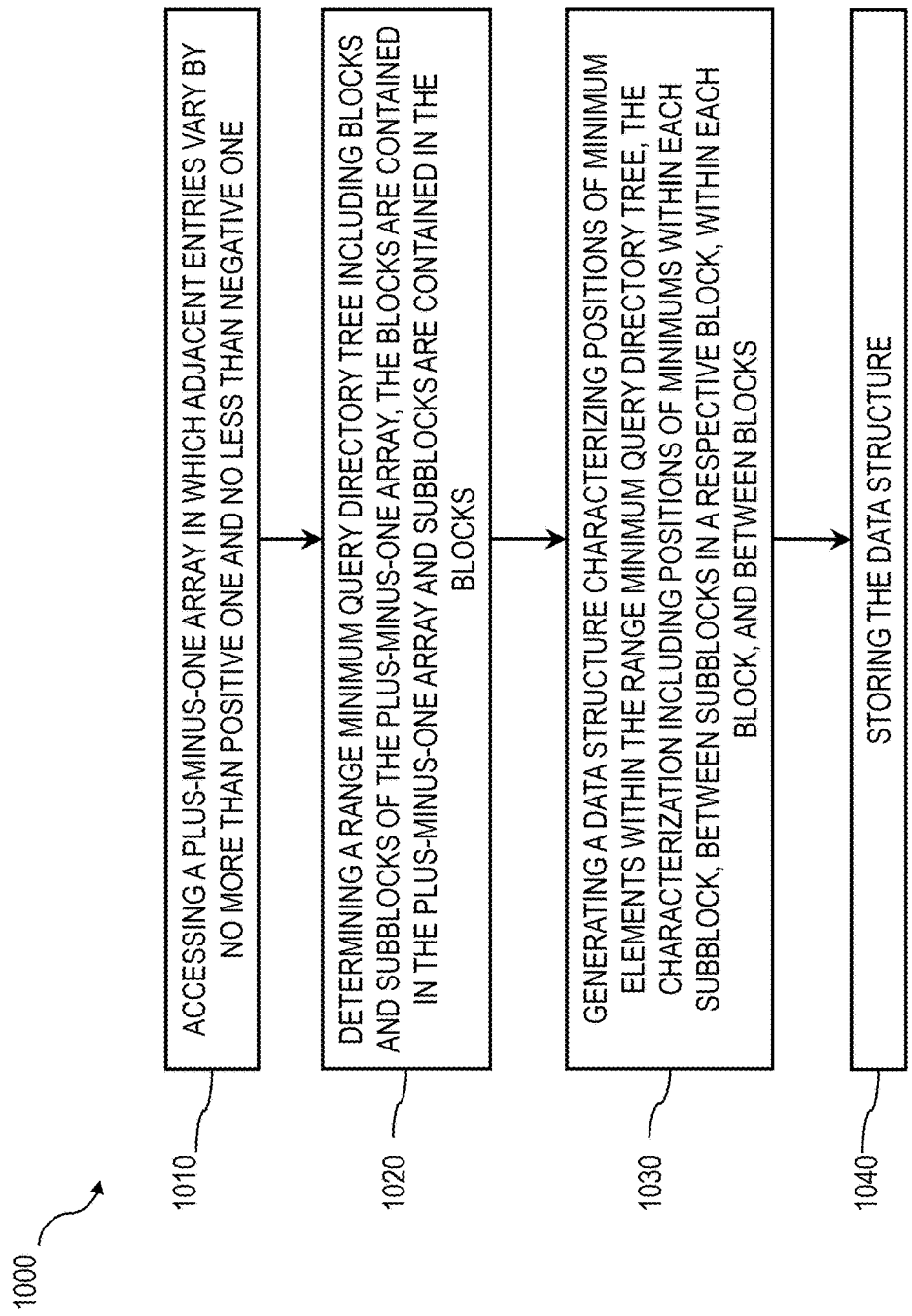
FIG. 10 is a process flow diagram illustrating a method of generating a data structure to enable constant time RMQ$\pm$.

FIG. 10 is a process flow diagram illustrating a method 1000 of generating a data structure to enable constant time RMQ± queries. At 1010, a plus-minus-one array can be accessed. The plus-minus-one array can be accessed from memory and/or provided as input into a RMQ± query.

At 1020, a RMQ± directory tree having blocks and subblocks can be determined, for example, as illustrated in FIG. 3. At 1030, a data structure characterizing positions of minimum elements within the RMQ± directory tree can be generated, for example, as illustrated in FIG. 4. At 1040, the data structure can be stored. The storing can be in a database system for future access during processing of an RMQ query.

Figure 11:
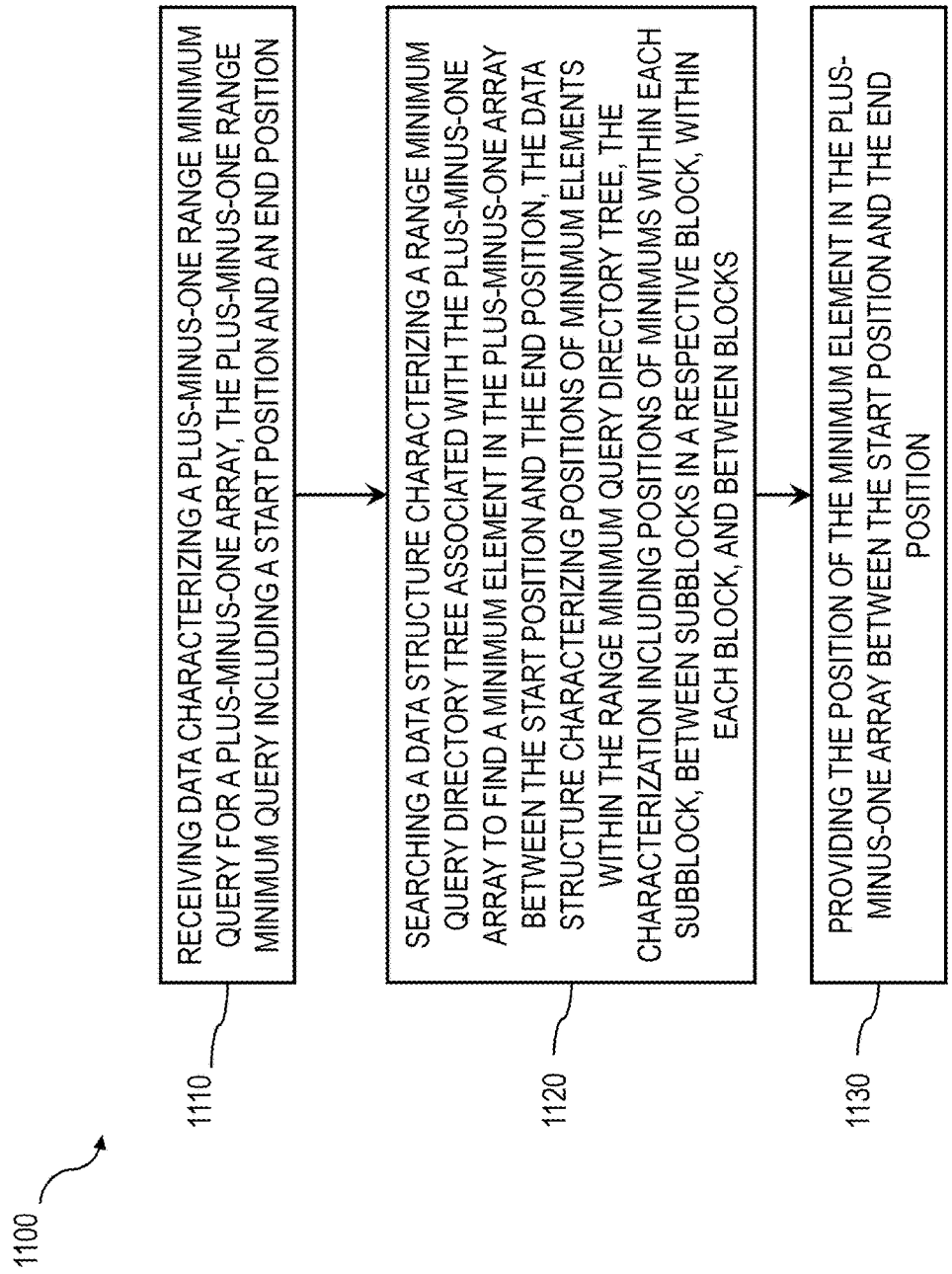
FIG. 11 is a process flow diagram illustrating a method of constant RMQ±.

FIG. 11 is a process flow diagram illustrating a method 1100 of constant RMQ±. At 1110, a plus-minus-one RMQ± query can be received. The query can include a plus-minusone array, a start position and an end position. Formally, the query is to answer RMQ$^\pm$ on A[s . . . e].

At 1120, a data structure can be searched through to find a minimum element in the plus-minus-one array in the range between the start position and the end position. The data structure can characterize a RMQ± directory tree including blocks and subblocks, for example, as illustrated in FIG. 3. The data structure can characterize positions of minimum elements within the RMQ± directory tree including positions of minimums within each subblock, between subblocks in a respective block, within each block, and between blocks, as illustrated in FIG. 9. The data structure can include at least one structure, for example, as illustrated in FIG. 4.

In some implementations, the searching can include determining if the start position (s) and the end position (e) are within a same subblock, within different subblocks of the same block, or within different blocks, as illustrated in FIG. 9. This can be performed, for example, by comparing the start position (s) and the end position (e) with the directory tree or another structure that characterizes boundaries of the blocks and subblocks.

If start position (s) and the end position (e) are within the same subblock, then, in the example data structure implementation described above, the position of the minimum element can be found directly from array MinInSubblock. For example, it can suffice to find the minimum between the two values in the array A at global positions given by MinInSubblock[i,s,k] and MinInSubblock[i,e−$2^k$+1,k], where i is the number of subblock of e and s, and k=[log (e−s+1)]. For example, such approach is illustrated in FIG. 9 with respect to subblock 905.

If start position (s) and the end position (e) are in different subblocks of the same block, then, in the example data structure implementation described above, the position of the minimum element can be found minimum between the values in array A, found at positions given by accessing MinInSubblock which finds the position of the minimum in the subblock of s and subblock of e, and by accessing MinBetweenSubblocks which finds the subblock m containing the minimum, between the subblock of s and subblock of e, for which we access array MinSubblock to get the position of that minimum inside subblock m. For example, such approach is illustrated in FIG. 9 with respect to block 910.

If start position (s) and the end position (e) are in different blocks, then, in the example data structure implementation described above, the position of the minimum element can be found by comparing the elements at the indexes found in: the subblock of s, by accessing MinInSubblock; the block of s, from the subblock that follows the subblock of s until the last subblock of the block, by accessing MinBetweenSubblocks; the blocks following after block of s until block preceding the block of e by accessing MinBetweenBlocks; the block of e, from first subblock of the block until the subblock preceding the subblock of e, by accessing MinBetweenSubblocks; and the subblock of e, by accessing MinInSubblock. For example, such approach is illustrated in FIG. 9 with respect to array 915.

At 1130, the position of the minimum element in the plus-minus-one array between the start position (s) and the end position (e) can be provided. The providing can include storing, transmitting, processing, and displaying.

In some implementations, a minimum range query for an arbitrary array and start and end positions can be received. A plus-minus-one array can be determined by computing a reduced bit vector that characterizes a binary tree of the arbitrary array, for example, as described above with reference to FIG. 1 and 2. The reduced bit vector can include a 1-bit for every leaf in the binary tree. The start position (s) and the end position (e) for the RMQ± can be determined by performing select operations on the bit vector with the start and end positions of the minimum range query for the arbitrary array (the non-plus-minus-one query).

Text Searching

The constant RMQ described herein can be implemented as an operation with accompanying data structure for efficiently enabling a RMQ operation in a text search engine. The search engine can search in database tables and in file document collections, for example, of an enterprise database system. Such a system can include the SAP HANA Vora, which is an in-memory query engine providing enriched interactive analytics on stored data. It leverages and extends the Apache Spark execution framework to provide enriched interactive analytics on enterprise and Hadoop data.

The amount of textual data stored by corporate enterprises has increased significantly in the last decades. A database must provide an efficient way of retrieving relevant information from this data. This task can be formalized as the document retrieval problem. For large text databases a sequential search over the contents is prohibitively slow.

Given a collection of documents and a user that requires information from this collection through queries, the goal is to retrieve the documents that match each query. A search engine is a system that solves this problem efficiently. It can use an index of the document collection. An index in this context is a set of data structures that enables the efficient retrieval of documents that match a search criterion.

Given a query, the search engine should retrieve as many relevant documents as possible while avoiding retrieving non-relevant documents. The relevance of a document can be defined in different ways. Also, the documents included in the result can be sorted by relevance.

There are two main strategies for the implementation of an index: Inverted indices and Suffix-based indices.

An inverted index includes a vocabulary (the set of words that are indexed and that can be part of a query) and a posting or document list for each word in the vocabulary. A posting list of a word is a list of document IDs corresponding to documents in which the word appears (more information can appear together with the document id, for example: position within the document, weight, or others). A common type of query is a conjunctive query. This is a query including one or more words and seeks to obtain the relevant documents that contain all the words in the query. To resolve this query, an inverted index retrieves the lists for each word and intersects them to obtain the list of documents that contain all words. This list can be further processed or sorted to reflect ranking or relevance.

Inverted indices generally require that the data can be parsed into words and that the vocabulary remains of reasonable size. Furthermore, in general they only allow for queries to full words. Because of this, they may not be suitable for use with text in some languages as well as for non-natural language databases (e.g., DNA, MIDI, source code).

Suffix-based indices are built on all suffixes of a text, and therefore do not require the concept of word and allow searching for arbitrary substrings in the text. Several types of indices fall in this category. Some implement data structures that are based on or inspired in Suffix Trees. A direct implementation of a Suffix Tree uses significant space and hence these structures encode similar information in less space at the expense of higher operation times. Examples of these structures are the Compressed Suffix Array (CSA), the Burrows-Wheeler-Transform (BWT), and Wavelet Trees.

Figure 12:
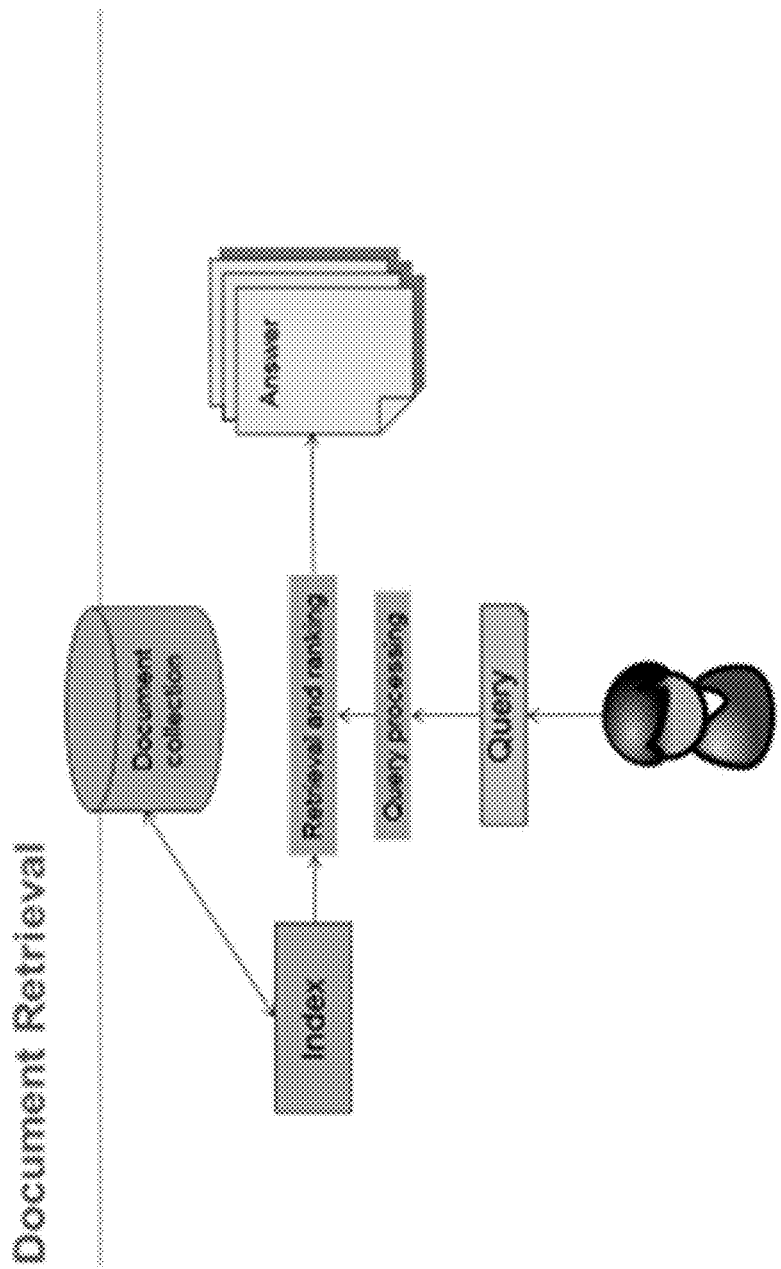
FIG. 12 is a system block diagram illustrating the document retrieval problem.
Figure 13:
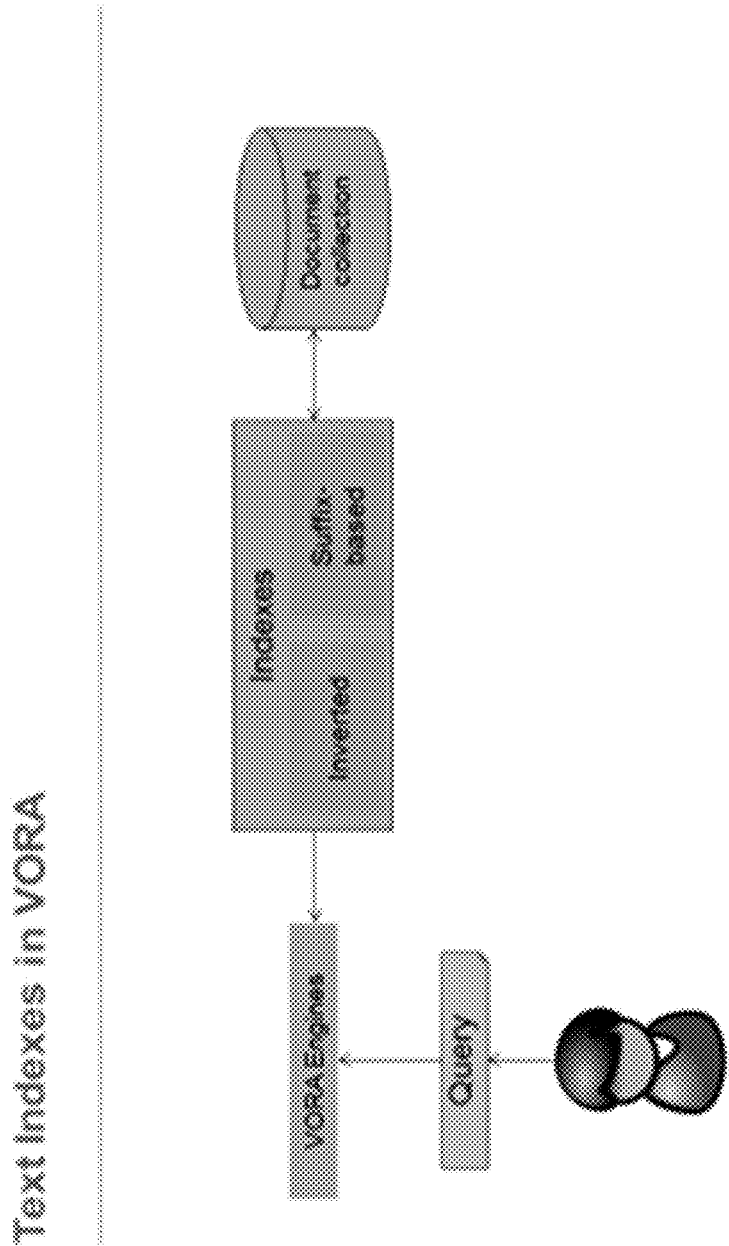
FIG. 13 is a system block diagram illustrating text indexes in a database query system.

FIG. 12 is a system block diagram illustrating the document retrieval problem and FIG. 13 is a system block diagram illustrating text indexes in a database query system. The inverted index is a library extracted from HANA and can be used directly from VORA.

The suffix-based index can be implemented in terms of different data structures. A Suffix Tree is a data structure that encodes information about all suffixes of a text. A Generalized Suffix Tree encodes information about the suffix of all texts in a document collection. For each suffix in the text collection there is a path in the tree that leads to a node indicating the location of the suffix in the text.

A search for a pattern is carried out by following the path from the root according to each character, until either no path can be followed (the pattern is not in the collection), the pattern ends at an internal node (the pattern occurs at all locations in the subtree rooted in the node), or a leaf is reached before finishing the pattern (the occurrence of the pattern can be verified in the text at the location indicated in the leaf).

A Suffix Array stores the locations of each suffix of the collection sorted lexicographically. A search is done simulating the search in the suffix tree following each branch by binary searching in the array the interval corresponding to the each character.

The Document Listing Problem relates to enumerating the IDs of documents that contain a pattern given a query consisting of a string (the pattern). Due to the high practical space requirements of suffix trees and suffix arrays several compressed versions of these structures have been devised, yielding various space-time trade-offs. Given a query, a search is carried out in the Suffix Array representation, identifying an interval of occurrences. Then, the document reporting structures allow the efficient identification of the documents that correspond to the suffixes in the interval.

Suffix Array Representations can take several forms, such as, for example, the plain Suffix Array implementation described above as well as a Compressed Suffix Array (CSA) and an FM-Index.

With respect to the CSA, instead of storing the entire Suffix Array in plain form, a compressed version is stored, together with extra information to retrieve any value of the array. The CSA leads to space savings at the expense of higher access time.

The CSA contains the same information as the initial Suffix Array, and it is constructed from the Suffix Array recursively using $$\left\lceil lg\left(\frac{lg(n)}{lg(\Sigma)}\right)\right\rceil$$

levels, where n is the length of the text and $\Sigma$ is the size of the alphabet.

At each level of compression, the data structure indexes half of the elements of the previous level. Start with $SA_0 = SA$, where SA is the Suffix Array of length n for the entire text. At each level $k, 0 \leq k < lglgn$ transform $SA_k$ into a more succinct representation storing instead a bit vector Bk with a data structure allowing rank operation on it, the function and $\Phi_k$ and $SA_k+1$ of half size of $SA_k$. At the final level $$k = \left\lceil lg\left(\frac{lg(n)}{lg(\Sigma)}\right)\right\rceil,$$

$SA_k$ is stored explicitly using n bits in total. In order to obtain the initial value of an element of the Suffix Array, apply the formula recursively $$\left\lceil lg\left(\frac{lg(n)}{lg(\Sigma)}\right)\right\rceil$$

times: $SA_k[i] = 2SA_{k+1}[rank_k(\Phi_k(i))] + B_k[i] - 1$, using constant time per level.

Another solution to reduce the space of the Suffix Array comes from the connection between the Burrows-Wheeler Transform (BWT) and the Suffix Array. The BWT is a permutation of the initial text T, defined as:

$$T^{BWT}[i] = \begin{cases} T[SA[i]-1], & \text{if } SA[i] > 1, \\ T[n], & \text{if } SA[i] = 1. \end{cases}$$

where T is of size n and SA is the Suffix Array of T. A property of BWT is that characters having the same context (i.e., string following them in T) are consecutive in $T^{BWT}$. Repetitions of characters in $T^{BWT}$ makes it easy to compress. The compressibility of the BWT and the indexing properties of the Suffix Array can be combined.

Once the BWT is constructed, the initial text is discarded. To retrieve the text from the structure, it is enough to invert the BWT. For this purpose, a table LF (last to first mapping) can be used, defined such that if T[i] is permuted to $T^{BWT}[j]$ and T[i−1] to $T^{BWT}[k]$, then LF[j]=k. Therefore, the text can be retrieved backwards by printing $\$T^{BWT}[1] \; T^{BWT}[LF[1]] \; T^{BWT}[LF[LF[1]]]. \ldots$ A property of LF is that it enables efficient query searches as an interval in the Suffix Array (e.g., all the corresponding suffixes in the interval start with the query). In order to store LF efficiently, it can be observed that LF[i] can be represented as the sum of the number of characters in $T^{BWT}$ are alphabetically smaller than the character $T^{BWT}[i]$ and the number of times the character $T^{BWT}[i]$ appears in $T^{BWT}$ until position i.

For full-text indexes, search queries consist in finding the interval [s,e] in the Suffix Array such that all corresponding suffixes from the interval have the pattern as their prefix in the text. The next step is to efficiently enumerate the distinct document IDs in which the pattern occurs at least once.

A first solution uses a document array D, in which element D[i] contains the ID of the document to which the suffix at SA[i] belongs. The document listing problem is then reduced to enumerating all the different values of elements in D[s . . . e]. To solve this problem, another array can be introduced, called predecessor array C. This array links each position in D to the previous occurrence of the same document ID or to 0, if this is the first occurrence of the document ID in D. The solution is based on the following observation. If an ID of a document occurs in D[s . . . e], then its leftmost occurrence $p \in [s \ldots e]$ is the one where it holds $C[p] < s$.

The problem is now reduced to finding all the values D[i] in D[s . . . e], with i in [s . . . e], for which C[i]<s. In order to find these values a data structure can be used to solve Range Minimum Queries (RMQ) on C[s . . . e]. The next minimum value i in the interval [s . . . e] can be found and the corresponding document ID(D[i]) can be reported, until the minimum is no longer smaller than s. These document IDs are the documents where the pattern occurs at least once.

Another solution reduces the space of the previous solution and can be used for compressed full-text indexes (like Compressed Suffix Array or FM-Index). The document array and the predecessor array are replaced by more succinct data structures.

RMQ queries can be used recursively on predecessor array C without accessing the array, which means it can be discarded. In order to verify whether this is the first occurrence of the document ID to report, instead of asking if C[p]<s, a bitmap to mark with 1 the document IDs that were already reported can be used.

Instead of the document array D, which is of the length of the text, a smaller array D' of length equal to the number of documents can be stored. This new array stores positions of the first character of each document in the text. It suffices to observe that D[i] is exactly the number of elements in D' that are no greater than SA[i]. Thus, using the Suffix Array, it is possible to extract the document ID for a given index.

In order to implement the above-describe text search engine functionality, several useful data structures can be implemented for efficiently enabling $Select_c(B,i)$—the position in the sequence B of the i-th occurrence of character c; $Rank_c(B,i)$—the number of times character c occurs in B[1 . . . , i]; and $RMQ_L(i,j)$—the position of a minimum value in the sequence L[i . . . j].

For a bit vector B, a rank operation usually refers to $Rank_1(B,i)$, i.e., finding the number of 1-bits in B[1 . . . , i], and is often written simply as Rank(B,i). For Rank operations on bit vectors can be implemented with the following data structure. The data structure stores two levels of pre-computed rank values: blocks and superblocks.

The bit array of length n is divided into blocks of size b=[logn/2]. Consecutive blocks are grouped into superblocks of equal size s=b[logn]. For each superblock j, store a number $R_s[j]$=Rank(B,j*s) representing the number of 1-bits from the start of the bit vector until the beginning of block j. For each block k of superblock j, store a number $R_b[k]$=Rank(B,k*b)−Rank(B,j*s) representing the number of 1-bits from the beginning of the superblock j until the beginning of block k. Finally, store a precomputed table indexed by bytes which allows us in 4 or 8 accesses to the table to calculate Rank(S,i) for every block S of length b and every position i<b.

Using the above data structure, a rank query on B is then computed in constant time by the formula:

$$Rank(B,i)=R_s[i\text{ div }s]+R_s[i\text{ div }b]+Rank(B[(i\text{ div }b)*b+1 \ldots, (i\text{ div }b)*b+b], i\text{ mod }b].$$

A constant select on bitmaps can be provided. A multi-level directory tree with fixed superblock and block sizes can be utilized for select operations on bit vectors. The multi-level directory tree is three levels and includes superblocks, blocks, and subblocks. A superblock is considered large when its length (e.g., the number of bits it contains) is greater than a constant value that is independent of the bit vector length. Similarly, blocks can be considered large when its length is greater than a second constant value that is independent of the bit vector length. Creating a select operation directory tree using definitions of large/small superblocks and large/small blocks that are fixed and independent of the length of the bit vector reduces the used space (e.g., overhead) of the directory tree data structure. In addition, the directory tree data structure can enable a select query having constant time per query.

For Rank and Select queries on arbitrary sequences (e.g., over a large alphabet), it is possible to construct a succinct data structure that reduces Rank/Select operations on a sequence T over a large alphabet Σ to Rank/Select operations on bitmaps.

First, it is possible to represent the given sequence T of length n as a σ×n table of 0's and 1's with rows indexed by the characters of T in alphabetical order and columns by positions of characters in the sequence. For example, entry [c,i] indicates whether c occurs in position i in the sequence (1 if c occurs in position i in T, and 0 otherwise). Let A be the bit vector of length nσ obtained by concatenating the rows of the constructed binary table. Observe that A contains exactly n 1-bits. There is a direct relation between Rank/Select operations on the sequence T and Rank/Select operations on the bit vector A:

$$Rank_c(T,i)=Rank_1(A,(c-1)n+i)-Rank_1(A,(c-1)n)$$

$$Select_c(T,i)=Select_1(A,Rank_1(A,(c-1)n)+i)$$

The operations Rank/Select on arbitrary sequences are thus reduced to Rank/Select on bitmaps. However, the bit vector A is still too big to be stored together with the data structure allowing constant Rank/Select on A. It is possible to construct a smaller bit vector that will have a direct relation between Rank/Select operations on this bit vector and Rank/Select operations on T or A.

The bit vector A of size nσ can be divided into n blocks of size σ each. The number of 1-bits in each block can be counted and stored in a new array C of length n. Thus, C[i] is the rank of block i. Observe that the sum of all elements in C is n. Instead of storing C it is possible to store a bit vector B representing the unary code of the sequence C. At this point, a smaller bit vector B of length 2n can be obtained. It suffices to find the relation between Rank/Select on B and Rank/Select on A.

It is possible to answer Rank queries on A for positions that are multiples of σ, i.e., $Rank_1(A,i\sigma)=Rank_1(B,Select_0(B,i))$. For all the other positions in A, there is need to build the following arrays. For answering Rank queries inside each block $A_k$ of A, a new array $E_k$ that stores the positions of the 1-bits in the block can be used. In the case where block $A_k$ does not contain any 1-bits, array $E_k$ is empty and it is not stored. E represents the concatenation of non-empty arrays $E_{i_1}, E_{i_2}, \ldots E_{i_s}$ in the same order as the blocks in A. Array E is of length n.

To answer a Rank query on a position i inside a block $A_k$, the current subject matter can include determining in constant time the interval [s,e] in E corresponding to the block, and searching for the two consecutive elements E[p] and E[r] of E[s,e] such that E[p]≤i≤E[r]. Finally, it suffices to binary search for the rank inside the bit sequence B[E[p] . . . E[r]].

To summarize performing a constant rank on arbitrary sequences summary, storing the bit vector B of length 2n and its data structure for constant Rank/Select on B, the array E of length n, it is possible to answer in constant time Rank operations on the initial sequence T.

RMQ and $RMQ^+$ operations can be implemented as described in detail above.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In some implementations, the current subject matter can be configured to be implemented in a system 1400, as shown in FIG. 14. The system 1400 can include one or more of a processor 1410, a memory 1420, a storage device 1430, and an input/output device 1440. Each of the components 1410, 1420, 1430 and 1440 can be interconnected using a system bus 1450. The processor 1410 can be configured to process instructions for execution within the system 1400. In some implementations, the processor 1410 can be a single-threaded processor. In alternate implementations, the processor 1410 can be a multi-threaded processor. The processor 1410 can be further configured to process instructions stored in the memory 1420 or on the storage device 1430, including receiving or sending information through the input/output device 1440. The memory 1420 can store information within the system 1400. In some implementations, the memory 1420 can be a computer-readable medium. In alternate implementations, the memory 1420 can be a volatile memory unit. In yet some implementations, the memory 1420 can be a non-volatile memory unit. The storage device 1430 can be capable of providing mass storage for the system 1400. In some implementations, the storage device 1430 can be a computer-readable medium. In alternate implementations, the storage device 1430 can be a floppy disk device, a hard disk device, an optical disk device, a tape device, non-volatile solid state memory, or any other type of storage device. The input/output device 1440 can be configured to provide input/output operations for the system 1400. In some implementations, the input/output device 1440 can include a keyboard and/or pointing device. In alternate implementations, the input/output device 1440 can include a display unit for displaying graphical user interfaces.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C; " "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
   accessing a plus-minus-one array in which adjacent entries vary by no more than positive one and no less than negative one;
   determining a range minimum query directory tree including blocks and subblocks of the plus-minus-one array, wherein blocks are contained in the plus-minus-one array, subblocks are contained in the blocks, and the subblocks contain two or more elements of the plus-minus-one array;
   generating a data structure characterizing positions of minimum elements within the range minimum query directory tree, the characterization including positions of minimums within each subblock, between subblocks in a respective block, within each block, and between blocks; and
   storing the data structure;
   wherein the data structure includes a first structure storing, for each block, a position of a local index of a subblock inside each block in which a minimum element of the block is contained.

2. The method of claim 1, wherein the data structure includes:
   a second structure storing, for each subblock, a position of a minimum element within each subblock;
   a third structure storing, for each subblock, a position of a minimum element between elements of the subblock;
   a fourth structure storing, for each block, a position of a subblock containing a minimum element between multiple subblocks within the respective block; and
   a fifth structure storing a block containing a minimum element between multiple block.

3. The method of claim 2, wherein each stored position is the local index in a respective block or subblock.

4. The method of claim 1 wherein at least one of the accessing, the determining, the generating, and the storing is performed by at least one data processor forming part of at least one computing system.

5. A method comprising:
   receiving data characterizing a plus-minus-one range minimum query for a plus-minus-one array, the plus-minus-one range minimum query including a start position and an end position;
   searching a data structure characterizing a range minimum query directory tree associated with the plus-minus-one array to find a minimum element in the plus-minus-one array between the start position and the end position,
      the range minimum query directory tree including blocks and subblocks of the plus-minus-one array, wherein blocks are contained in the plus-minus-one array, subblocks are contained in the blocks, and the subblocks contain two or more elements of the plus-minus-one array,
      the data structure characterizing positions of minimum elements within the range minimum query directory tree, the characterization including positions of minimums within each subblock, between subblocks in a respective block, within each block, and between blocks; and
   providing the position of the minimum element in the plus-minus-one array between the start position and the end position;
   wherein the data structure includes a first structure storing, for each block, a position of a local index of a subblock inside each block in which a minimum element of the block is contained.

6. The method of claim 5, wherein the data structure includes:
   a second structure storing, for each subblock, a position of a minimum element within each subblock;
   a third structure storing, for each subblock, a position of a minimum element between elements of the subblock;
   a fourth structure storing, for each block, a position of a subblock containing a minimum element between multiple subblocks within the respective block; and
   a fifth structure storing a block containing a minimum element between blocks.

7. The method of claim 6, wherein searching the data structure includes determining if the start position and the end position are: within a same subblock, within different subblocks of the same block, or within different blocks.

8. The method of claim 7, wherein searching the data structure includes finding the position of the minimum element from the third data structure.

9. The method of claim 7, wherein searching the data structure includes finding, using the fourth structure, a subblock containing the minimum element and finding, using the second structure, the position of the minimum element within the subblock containing the minimum element.

10. The method of claim 5, further comprising:
    receiving a range minimum query, the range minimum query including an input array, a second start position within the input array, and a second end position within the input array;
    determining the plus-minus-one array from the input array by computing a reduced bit vector that characterizes a binary tree of the input array, the bit vector including a 1-bit for every leaf in the binary tree; and
    determine the start position and the end position using select operations on the reduced bit vector with the second start position and the second end position.

11. The method of claim 5, wherein at least one of the receiving, the searching, and the providing is performed by at least one data processor forming part of at least one computing system.

12. A system comprising at least one data processor and memory storing instructions which, when executed by the at least one data processor, causes the at least one data processor to perform operations comprising:
    receiving data characterizing a plus-minus-one range minimum query for a plus-minus-one array, the plus-minus-one range minimum query including a start position and an end position;
    searching a data structure characterizing a range minimum query directory tree associated with the plus-minus-one array to find a minimum element in the plus-minus-one array between the start position and the end position,
       the range minimum query directory tree including blocks and subblocks of the plus-minus-one array, wherein blocks are contained in the plus-minus-one array, subblocks are contained in the blocks, and the subblocks contain two or more elements of the plus-minus-one array,
       the data structure characterizing positions of minimum elements within the range minimum query directory tree, the characterization including positions of minimums within each subblock, between subblocks in a respective block, within each block, and between blocks; and providing the position of the minimum element in the plus-minus-one array between the start position and the end position;

wherein the data structure includes a first structure storing, for each block, a position of a local index of a subblock inside each block in which a minimum element of the block is contained.

13. The system of claim 12, wherein the data structure includes:
   a second structure storing, for each subblock, a position of a minimum element within each subblock;
   a third structure storing, for each subblock, a position of a minimum element between elements of the subblock;
   a fourth structure storing, for each block, a position of a subblock containing a minimum element between multiple subblocks within the respective block; and
   a fifth structure storing a block containing a minimum element between multiple block.

14. The system of claim 13, wherein searching the data structure includes determining if the start position and the end position are: within a same subblock, within different subblocks of the same block, or within different blocks.

15. The system of claim 14, wherein searching the data structure includes finding the position of the minimum element from the third data structure.

16. The system of claim 14, wherein searching the data structure includes finding, using the fourth structure, a subblock containing the minimum element and finding, using the second structure, the position of the minimum element within the subblock containing the minimum element.

17. The system of claim 12, further comprising:
   receiving a range minimum query, the range minimum query including an input array, a second start position within the input array, and a second end position within the input array;
   determining the plus-minus-one array from the input array by computing a reduced bit vector that characterizes a binary tree of the input array, the bit vector including a 1-bit for every leaf in the binary tree; and
   determine the start position and the end position using select operations on the reduced bit vector with the second start position and the second end position.

* * * * *